June 27, 1967 W. L. HOSS 3,328,682
TESTER HAVING A PAIR OF INDICATOR LAMPS FOR ELECTRIC
SINGLE PHASE WATTMETER SOCKETS
Filed Aug. 16, 1965 2 Sheets-Sheet 1
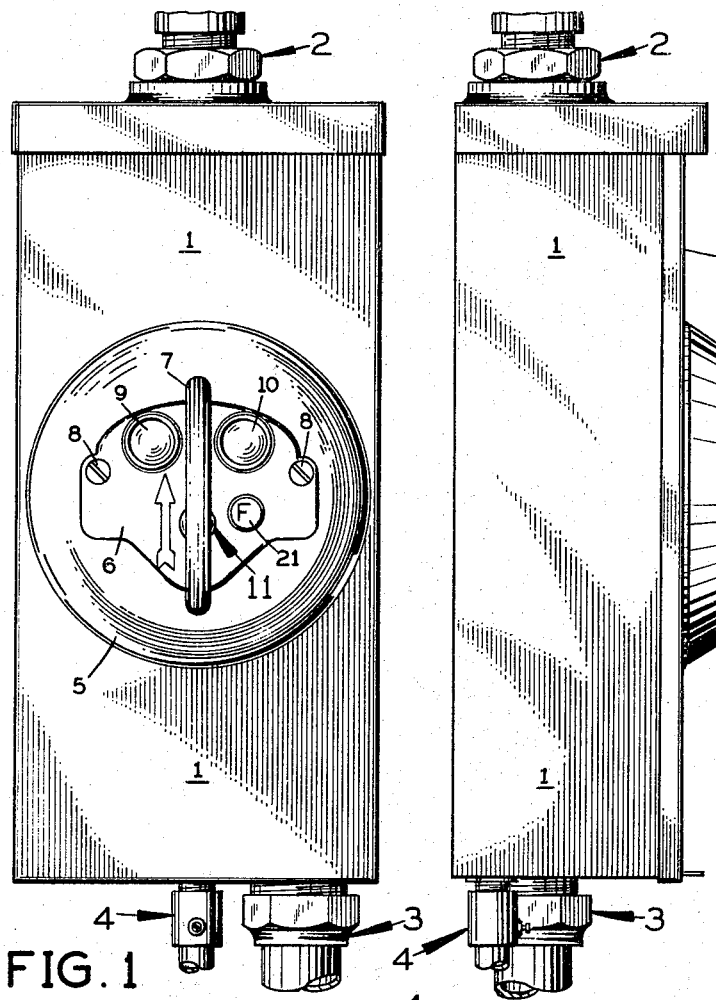
FIG. 1
FIG. 2
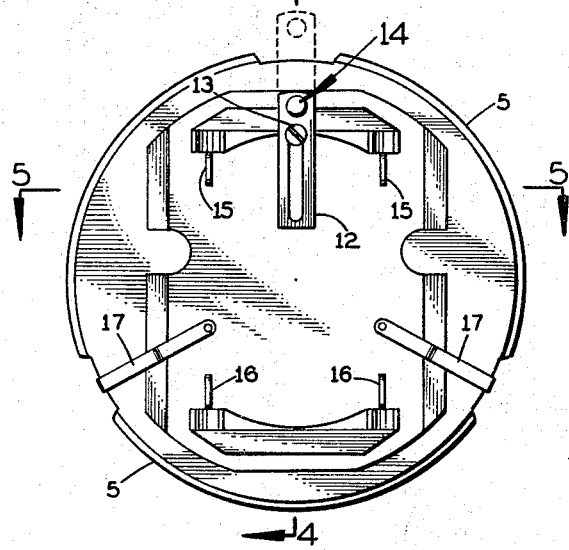
FIG. 3
INVENTOR.
WILLIAM L. HOSS
BY June 27, 1967  W. L. HOSS  3,328,682
TESTER HAVING A PAIR OF INDICATOR LAMPS FOR ELECTRIC
SINGLE PHASE WATTMETER SOCKETS
Filed Aug. 16, 1965  2 Sheets-Sheet 2
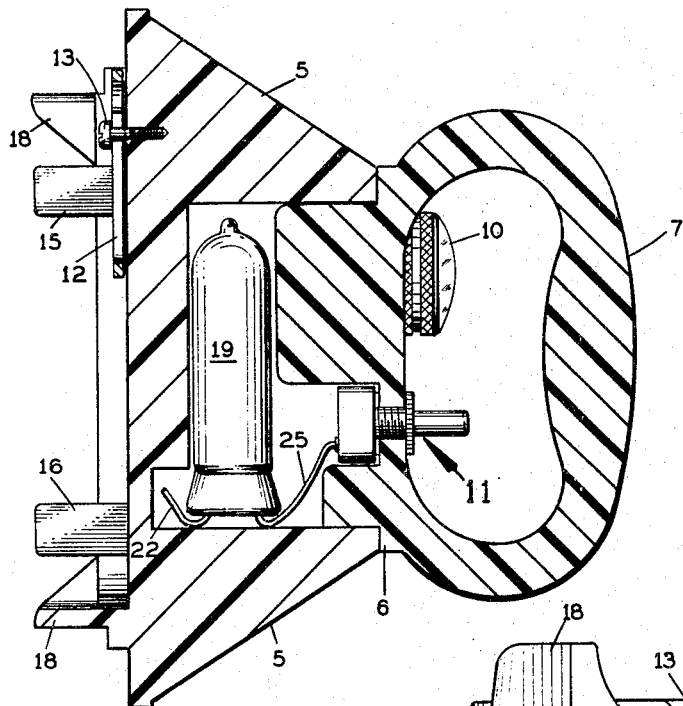
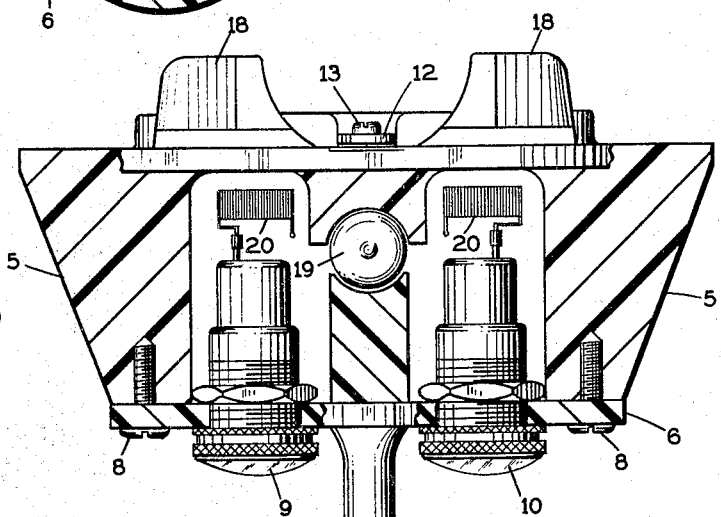
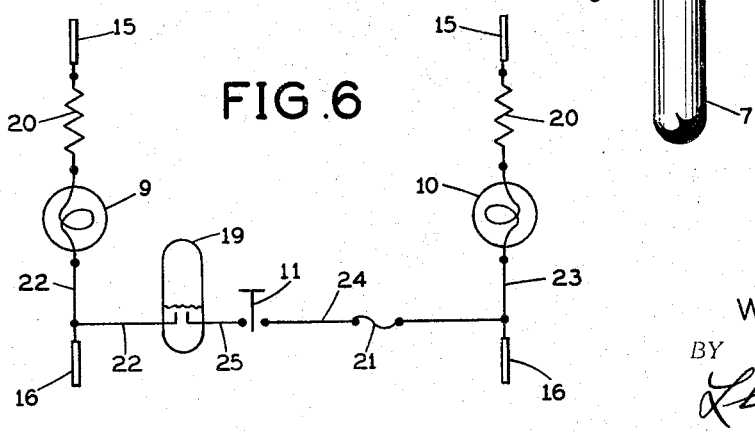
INVENTOR.
WILLIAM L. HOSS
BY United States Patent Office 3,328,682
Patented June 27, 1967

3,328,682
TESTER HAVING A PAIR OF INDICATOR LAMPS FOR ELECTRIC SINGLE PHASE WATTMETER SOCKETS
William L. Hoss, 3016 Lunds Lane, West Palm Beach, Fla. 33405
Filed Aug. 16, 1965, Ser. No. 480,064
2 Claims. (Cl. 324—51)

ABSTRACT OF THE DISCLOSURE

A unitary body for fitted insertion into a wattmeter socket for testing the circuits terminating therein.

---

This invention relates in general to electric testing devices and more particularly to a tester for wattmeter sockets prior to the installation of the wattmeter.

Prior to this invention the socket for single phase wattmeters was tested by the manual use of voltmeters or test lamps and continuity meters in order to determine whether or not the power terminals were properly connected to the power source and that the load terminals were free from short circuits. This time consuming form of testing is largely dependent upon operator skill, with an ever present danger of electric shock.

A principal object of the invention is the provision of a unitary plug for insertion into a wattmeter socket which contains electric components for indicating both the condition of the input and output circuits by simple operation and observation.

Another object of the invention is the provision of a unitary plug for visually testing the input and output circuits in a wattmeter socket including a gravity operated switch for disabling the test unit when accidentally plugged into the socket in an inverted position, including an auxiliary fuse as a safety precaution against the failure of the gravity switch.

These and other objects and advantages in one embodiment of the invention are described and shown in the following specification and drawings, in which:

FIG. 1 is a front elevation of a typical watt-meter socket with the tester plugged therein, in reduced scale.

FIG. 2 is a side elevation thereof.

FIG. 3 is an enlarged rear elevation of the tester shown in FIGS. 1 and 2.

FIG. 4 is a cross sectional side elevation taken through section line 4—4, FIG. 3.

FIG. 5 is a cross sectional plan view taken through section line 5—5, FIG. 3.

FIG. 6 is a schematic wiring diagram of the device.

Referring to FIGS. 1 and 2, a casing 1 is provided with a typical conduit connector assembly 2 for receiving single phase power inlet conductors and typical conduit connector assemblies 3 and 4 for receiving the load conductors. The front of casing 1 has a circular opening therein with four conductor clip type sockets, not shown, for receiving the connector blades of the wattmeter and test plug.

Referring to FIGS. 1, 2, and 3, the main body 5 of the tester is molded from dielectric material and provided with a cover member 6 including an integral handle 7, secured on the front side body 5 by screws 8—8, as shown. A pair of bullseye lamp sockets 9 and 10 including electric lamps therein are secured in the cover member 6 and will be hereinafter described. A momentary push button switch 11, better shown in FIG. 4, is also secured in cover member 6 directly beneath the handle 7.

Referring to the rear side of the tester, a flat hanger 12 is slidably secured on the rear side of body 5 by a shoulder screw 13 and has a hole 14 in the outer end thereof whereby the slide may be withdrawn, as shown in dotted lines, for conveniently hanging the tester when not in use.

A pair of power input blades 15—15 are molded in and project from body 5 and a pair of outlet load blades 16—16 are also molded in and project from body 5, as shown.

A pair of clips 17—17 are pivoted to the rear side of body 5 for locking engagement in certain meter sockets by well known means, not shown.

Referring to FIGS. 3, 4 and 5, the rear side of body 5 for locking engagement in certain meter sockets by well known means, not shown.

Referring to FIGS. 3, 4 and 5, the rear side of body 5 includes projections 18 and other contours conforming with like projections and contour of the wattmeter to be installed. A mercury switch 19 is positioned vertically in "closed" position within body 5, as shown, and will be hereinafter described. A pair of resistors 20 are also secured within the body 5, as shown in FIG. 5, for extending the normal life of the lamps and protecting same when subject to abnormal high voltage from the power source. A fuse assembly 21 of the quick removable cartridge type is secured in cover member 6 and will be hereinafter described.

Referring to FIG. 6, each of the power input blades 15 are connected to one terminal of lamps 9 and 10 by a resistor 20. The remaining terminal of lamp 9 is connected to a power load blade 16 and one terminal of the mercury switch 19 by conductor 22. The remaining terminal of lamp 9 is connected to a power load blade 16 and one terminal of the mercury switch 19 by conductor 22. The remaining terminal of lamp 10 is connected to load blade 16 and one terminal of fuse 21 by conductor 23. The remaining terminal of fuse 21 is connected to one terminal of momentary switch 11 by conductor 24. The remaining terminal of switch 11 is connected to the remaining terminal of switch 19 by conductor 25.

In operation and under the assumption that lamps 9 and 10 are operative and the tester is plugged into the meter socket with the arrow pointing upward, as shown in FIG. 1, then in the event that neither light is lighted the input power circuit is either de-energized or otherwise normal. When the momentary switch 11 is depressed, both lamps should light with predetermined reduced brilliance dependent upon the value of resistors 20, which indicates proper voltage at the input portion of the socket.

In the event that the lamps do not light when the switch 11 is depressed then a check should be made for an "open" or improper phase connection at the source of power.

In the event of a line to ground fault on the load side of the socket, either of the lamps will be lighted without depressing the switch 11.

The lighting of both lamps without pressing switch 11 indicates a short circuit on the load side of the socket or a line to ground short on both sides of the load circuit.

In the event the tester is inserted in the socket in inverted position, without regard to the arrow shown in FIG. 1, then the gravity operated mercury switch will "open" and thus prevent the input circuit from being short circuited, as well as to preclude normal testing.

The fuse 21 is provided in the parallel circuit as an added precaution in the event of the failure of the switch 19 to open when the plug is inverted in order to protect both the power circuit and the operator.

It is apparent that when a two wire one side ground socket installation is tested only one light will light when the switch 11 is depressed.

It is also apparent that the above description applies to a typical single phase three wire circuit with a grounded center conductor and two "hot" legs.

It is understood that certain modifications in the construction, utilizing the features above described, are intended to come within the scope of the appended claims.

Having described my invention, I claim:

1. A circuitry tester for a single phase wattmeter socket having power input circuit and load circuit clips therein connected to corresponding power and load circuits respectively comprising a unitary body of dielectric material dimensioned for slidable insertion into said socket including a handle on the front side thereof for inserting the said body in predetermined position, a pair of spaced conducting input blades projecting from the rear side of said body opposite the said handle for engaging corresponding said power input circuit clips in said socket, a pair of spaced output conducting blades projecting from the said rear side of said body for engaging a corresponding pair of output load circuit clips in said socket, a pair of indicating electric lamps in said body visible from the said front side thereof when energized, a resistor of predetermined value connected between one terminal of each of said lamps and each of said input blades respectively for reducing the normal brilliancy of said lamps when energized, the remaining terminal of each of said lamps connected to each of said output blades respectively, a normally open single circuit momentary switch in said body positioned for operation from the front side thereof with each terminal thereof connected to each of said output blades respectively whereby said lamps will operate at a predetermined brilliancy less than normal when said switch is operated and said output blades are normally energized by said input circuit and whereby the operation of said lamp at a greater brilliancy will indicate excessive power circuit voltage and whereby the illumination of either of said lamps without depressing said switch indicates a ground fault in said load circuit and whereby the energizing of both said lamps without depressing said switch indicates a short circuit of said load circuit.

2. The construction recited in claim 1 including a gravity operated switch in said body connected in series with said momentary switch adapted to be in closed position when said tester is properly inserted in said socket and adapted to open when said tester is inserted in said socket in improper inverted position for automatically protecting said power circuit against short circuit by the operation of said momentary switch.

References Cited

UNITED STATES PATENTS

| 2,548,991 | 4/1951 | McNabb | 324—51 |
| 2,610,237 | 9/1952 | Benner | 324—51 X |
| 2,956,229 | 10/1960 | Henel | 324—133 |

FOREIGN PATENTS 652,423    11/1962    Canada.

RUDOLPH V. ROLINEC, *Primary Examiner.*

G. R. STRECKER, *Assistant Examiner.*